United States Patent Office 3,047,515
Patented July 31, 1962

3,047,515
PREPARATION OF POLYESTERS USING
TITANIUM-CONTAINING CATALYSTS
Aleksander Piirma, Stow, Ohio, assignor to The Goodyear
Tire & Rubber Company, Akron, Ohio, a corporation
of Ohio
No Drawing. Filed July 9, 1956, Ser. No. 596,419
11 Claims. (Cl. 260—2)

This invention relates to ester interchange processes. More particularly it relates to an improvement in such processes by the use, as catalysts, of certain titanium derivatives.

The ester interchange catalysts of the invention are especially useful in the preparation of linear superpolyesters and, therefore, the practice of the invention will be illustrated with particular reference to such materials.

In the preparation of linear superpolyesters, one of the most satisfactory methods from the standpoint of simplicity of reaction and economy of operation has been the ester interchange method in which the esters of the acids are reacted with a glycol to form the diglycol ester of the acid or a low molecular weight polymeric polyester which is then polymerized to a high molecular weight polymeric polyester by a condensation reaction with splitting out of the glycol. This process, however, has not been entirely satisfactory because the initial ester interchange reaction is slow and because many of the materials that catalyze this reaction are not effective as catalysts for the subsequent condensation reaction.

Heretofore various materials have been proposed as catalysts for the ester interchange reaction between the glycols and the dicarboxylic acid esters and for the subsequent polymerization or condensation reaction. Metals in the form of powder, chips, ribbon or wire have been suggested, as have surface catalysts such as broken glass or silica gel. Other catalysts suggested in the past have been alkali metal and alkaline earth metal alcoholates, alkali metal carbonates, or other alkaline reacting salts, alkaline earth oxides and litharge.

Many of these materials are effective catalysts for the initial simple ester interchange and some of them catalyze the condensation reaction. However, many of the substances that catalyze the condensation reaction carry the polymerization only to a low degree, or they do not promote the reaction effectively enough to give reaction rates acceptable for a commercial process.

The alkyl titanates, such as tetraisopropyl titanate, have been suggested as ester interchange catalysts for certain ester interchange reaction. They are highly reactive liquid materials and are difficult to handle in the small quantities used as catalysts. They hydrolyze readily, even on contact with moist air and, consequently, apparatus in which they are used must be dry and the materials whose interactions they catalyze must be absolutely anhydrous to preclude hydrolysis of the alkyl titanate with the concomitant loss of catalyst.

According to the present invention, it has been found that preformed organic titanium compounds formed by the reaction of titanic acid esters with polyhydroxy, polycarboxylic and hydroxy carboxylic organic compounds catalyze ester interchange reactions. Moreover, in the preparation of linear superpolyesters, they not only catalyze the initial ester interchange reaction but also accelerate the rate of polymerization and permit the formation in relatively short reaction times of polymers of high molecular weight which may be readily processed to form products having excellent properties.

The catalysts of the invention are conveniently prepared by reacting tetra-substituted titanates, i.e., esters of titanic acid, with organic polyhydroxy compounds, organic polycarboxylic compounds and/or organic hydroxy carboxylic compounds.

Either alkyl, aryl or aralkyl titanates, or titanates containing mixtures of such substituents, can be used as starting materials to prepare the catalysts of the invention. Representative examples are tetramethyl titanate, tetraethyl titanate, tetrapropyl titanate, tetraisopropyl titanate, the tetrabutyl titanates, tetraphenyl titanate, tetratolyl titanate, methyltriphenyl titanate, ethyltriphenyl titanate, butyltriphenyl titanate, dipropyldiphenyl titanate, dibutyldiphenyl titanate, trimethylphenyl titanate, triethylphenyl titanate, tripropylphenyl titanate, tributylphenyl titanate, tetrabenzyl titanate, butyl-tribenzyl titanate, dibutyldibenzyl titanate and tributyl-benzyl titanate.

The catalysts derived by reacting the titanic acid esters with polyhydroxy organic compounds can be considered to be ester derivatives of titanic acid having titanium attached through from two to four of its valence bonds to polyhydric organic compound residues, the titanium valences not occupied by polyhydric organic compound residues being occupied by radicals selected from the group consisting of alkoxy, aryloxy and aralkoxy radicals. They can be prepared by reacting the starting titanic acid ester with a sufficient quantity of a polyhydric organic compound to replace an average of from about 2 to 4 of the groups of the original titanate compound. Thus, the catalysts embrace the simple reaction products in which at least two of the original substituent groups are replaced, as represented by the following structural formulas:

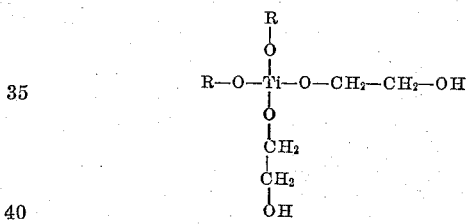

and

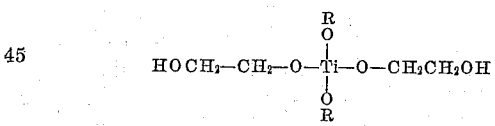

Also included are polymeric materials in which an average of two to four of the original groups are replaced and a plurality of titanium atoms are linked through polyhydric compound residues, as illustrated by the following structural formulas:

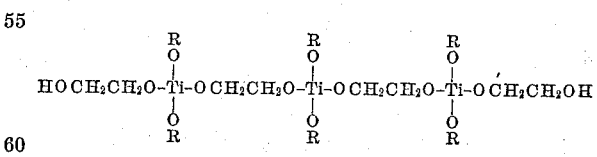

and

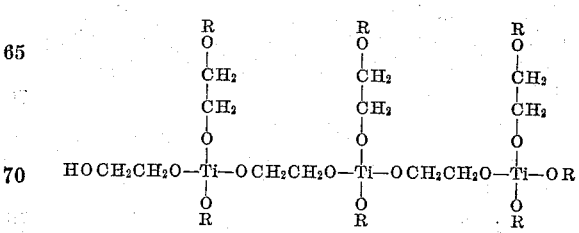

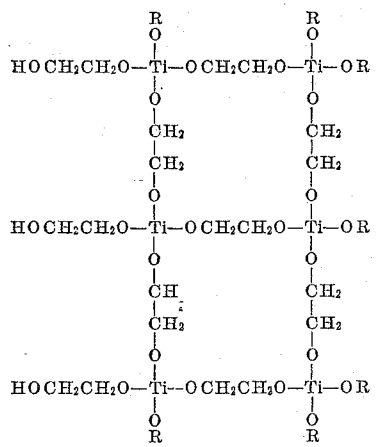

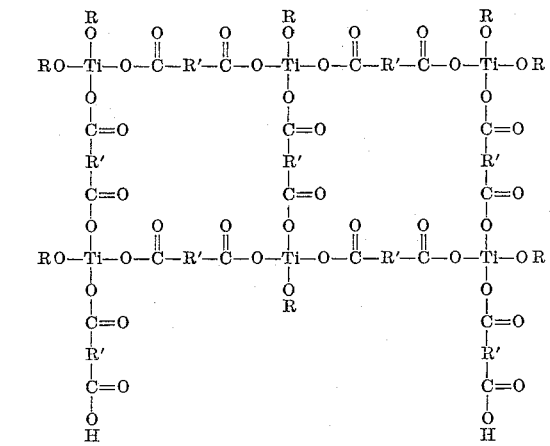

In each of these formulas, ethylene glycol has been used as a representative polyhydric organic compound, and the R's are the residual alkyl, aryl or aralkyl substituents of the original titanate.

Various polyhydric compounds, including aliphatic, aromatic and mixed aromatic-aliphatic compounds, can be used to prepare the catalysts. Representative examples are ethylene glycol, trimethylene glycol, 1,2-propylene glycol, tetramethylene glycol, 1,2-butylene glycol, 1,4-butylene glycol, pentamethylene glycol, decamethylene glycol, glycerine, pentaerythritol, catechol, resorcinol, hydroquinone, orcinol, pyrogallol, phloroglucinol, 2-phenyl-1,3-propylene glycol, ortho hydroxy benzyl alcohol and para hydroxy benzyl alcohol. The glycols, and more particularly the polymethylene glycols are preferred materials.

The catalysts of the invention which which are titanium derivatives of polycarboxylic acids can be considered to be esters of the acids with titanium tetrahydroxide having titanium attached through from one to three of its valence bonds to polycarboxylic acid residues and the titanium valences not occupied by polycarboxylic organic compound residues being occupied by radicals selected from the group consisting of alkoxy, aryloxy and aralkoxy radicals. They can be prepared by reacting the starting titanate with a sufficient quantity of an organic polycarboxylic acid to replace an average of from about one to three of the substituent groups of the original titanate. Thus, the catalysts embrace the simple reaction products in which, for example, one of the substituent groups is replaced, such as those represented by the following formulas:

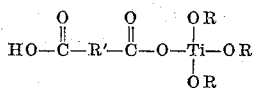

and

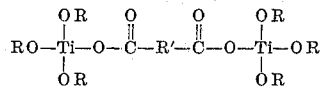

as well as polymeric materials in which up to three of the original groups are replaced and a plurality of titanium atoms are linked through polycarboxylic compound residues, such as

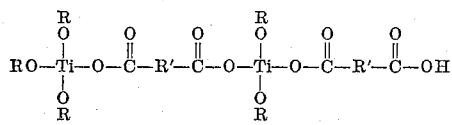

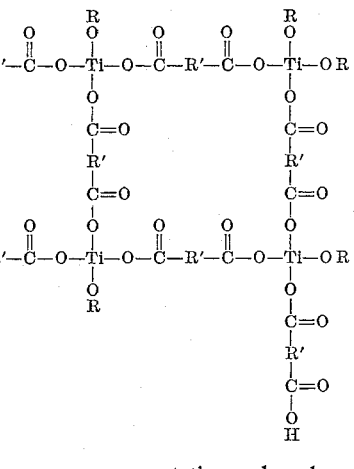

In these formulas, as a representative polycarboxylic acid, there is used a dicarboxylic acid of the general formula

in which R' is aliphatic, aromatic or araliphatic hydrocarbon. Again the R's are the residual substituents of the original titanates.

Various polycarboxylic compounds, including aromatic, aliphatic and mixed aromatic-aliphatic acids, can be used to prepare the catalysts. Representative polycarboxylic acids are oxalic acid, malonic acid, succinic acid, glutaric acid, adipic acid, pimelic acid, suberic acid, azelaic acid, sebacic acid, brassylic acid, 1,2,4-hexane tricarboxylic acid, tricarballylic acid, di-malonic acid, fumaric acid, maleic acid, aconitic acid, glutaconic acid, terephthalic acid, isophthalic acid, ortho phthalic acid, diphenic acid, the various naphthalene dicarboxylic acids, the phenylene diacetic acids, the naphthalene dipropionic acids, trimesic acid, 1,4,5,8-naphthalene tetracarboxylic acid, cyclohexanetetrapropionic acid, dicyclohexane-4,4'-dicarboxylic acid, diphenyl methane-4,4'-dicarboxylic acid, 1,4-bis (phenoxy methyl)benzene-4',4" dicarboxylic acid and diphenyl thio ether-4,4'-dicarboxylic acid.

The catalysts of the invention which are titanium derivatives of hydroxy carboxylic acids are mixed derivatives which can be regarded as esters of titanic acid or carboxylic acid esters, depending on the point of attachment, having titanium attached through from one to four of its valence bonds to hydroxy carboxylic acid residues, the titanium valences not occupied by hydroxy carboxylic acid residues being occupied by radicals selected from the group consisting of alkoxy, aryloxy and aralkoxy radicals. They can be prepared by reacting the starting titanate with a sufficient quantity of a hydroxy carboxylic acid to replace an average of from one to four of the substituent groups of the original titanate. Thus, the catalysts embrace the simple reaction products in which one of the original groups is replaced by a hydroxy carboxylic acid such as the compounds represented by the following formulas, in which there is used a representative hydroxy carboxylic acid of the general formula

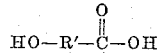

in which R' is aromatic, aliphatic or araliphatic

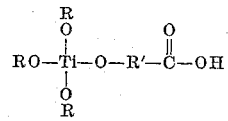

and

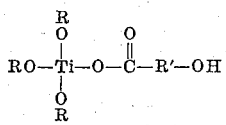

as well as polymeric materials in which up to four of the original groups are replaced and a plurality of titanium atoms are linked through hydroxy carboxylic compound residues such as

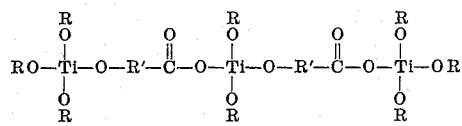

and

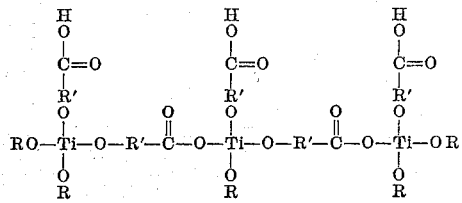

and

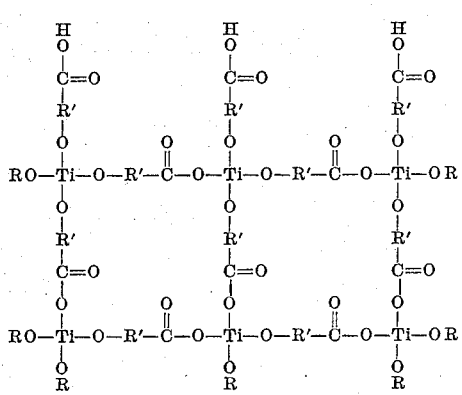

Here again the R's are the residual substituents of the original titanates.

Either aliphatic, aromatic or araliphatic hydroxy carboxylic acids can be used to prepare the catalysts. Representative examples are glycollic acid, lactic acid, the hydroxy butyric acids, the hydroxy valeric acids, o-hydroxy benzoic acid, m-hydroxy benzoic acid, p-hydroxy benzoic acid, and p-(beta hydroxy ethyl) benzoic acid.

The examples below are illustrative of the preparation of the catalysts of the invention.

*Example 1*

Twenty parts of tetraisopropyltitanate were dissolved in 50 parts of benzene and 10 parts of ethylene glycol were added. The mixture warmed up from the heat of reaction of the materials and after 30 minutes standing, a white precipitate separated from the mixture. The reaction mixture was allowed to stand at room temperature for 24 hours. The precipitate, ethylene glycol titanate, was filtered from the mother liquor and washed with benzene and dried. The product was a white powder, soluble in hot ethylene glycol. It was not hydrolyzed by water at room temperature.

*Example 2*

A mixture of 28 parts of tetraisopropyl titanate, 18 parts of 1,4-butane diol and 100 parts of toluene was heated at 100° C. for one hour. It was then allowed to stand at room temperature for seven days. Twelve parts of a solid material, tetramethylene glycol titanate, were obtained.

*Example 3*

Twenty-eight parts of tetraisopropyl titanate were added to a solution of 35 parts of decamethylene glycol in 100 parts of dioxane. The mixture was heated at 100° C. for 30 minutes and then allowed to stand at room temperature for 18 hours. Sixteen parts of a pale yellow solid, decamethylene glycol titanate, were obtained.

*Example 4*

A mixture of 14 parts of glycerol and 28 parts of tetraisopropyl titanate in 100 parts of dioxane was heated at 100° C. for 30 minutes. The mixture was allowed to stand at room temperature for 18 hours. Thirteen parts of a white solid, glycerol titanate, were obtained.

*Example 5*

Three parts of isopropyl titanate were added to a solution of 2.2 parts of resorcinol dissolved in 20 parts of dioxane. The mixture was heated at 80° C. for two hours. The precipitate formed was filtered from the solution, washed with benzene and dried. The product, resorcinol titanate, was a brown powder which was soluble in hot ethylene glycol.

*Example 6*

Two parts of isopropyl titanate were added to 1.0 part of isophthalic acid in 20 parts of hot dioxane. The mixture was heated at 90° C. for 3 hours. The product was filtered from the solution, washed with benzene and dried. One and two-tenths parts of a solid material, isopropoxy titanium isophthalate, were obtained.

*Example 7*

Nineteen parts of ethylene glycol and 20 parts of a 75–25 dimethyl terephthalate-dimethyl isophthalate mixture were placed in a 30 millimeter inside diameter glass tube, and 0.004 part of tetramethylene glycol titanate prepared in Example 2 was added. The reactants were heated and stirred for one hour at 197° C. under 1 atmosphere of nitrogen. Ninety-eight percent of the calculated yield of methanol was recovered. The pressure was reduced to 0.1 millimeter of mercury pressure, and the unreacted ethylene glycol was distilled off. The temperature was then raised to 280° C., and the pressure was adjusted to 0.3 millimeter of mercury pressure by controlling the flow of nitrogen gas into the system. After one hour of condensation at 280° C., a 75–25 ethylene terephthalate-ethylene isophthalate copolyester having a melt viscosity at 280° C. of 1900 poises was obtained. The copolyester was clear and had a light yellow color.

*Example 8*

The product of Example 3 was used as the sole catalyst to prepare the 75–25 ethylene terephthalate-ethylene isophthalate copolyester of this example. Nineteen parts of thylene glycol and 20 parts of a 75–25 dimethyl terephthalate-dimethyl isophthalate mixture were reacted together using 0.007 part of decamethylene glycol titanate according to the method of Example 7. The copolymer prepared had a melt viscosity at 280° C. of 1800 poises. The copolyester was clear and had a light yellow color.

*Example 9*

The product of Example 4 was used as the sole catalyst to prepare the 75–25 ethylene terephthalate-ethylene isophthalate copolyester of this example. Nineteen parts of thylene glycol and 20 parts of a 75–25 dimethyl terephthalate-dimethyl isophthalate mixture were reacted together using 0.003 part of glycerol titanate according to the method of Example 7. The copolymer prepared had a melt viscosity at 280° C. of 2000 poises. The copolyester was clear and had a light yellow color.

*Example 10*

The product of Example 5 was used as the sole catalyst to prepare the 75–25 ethylene terephthalate-ethylene isophthalate copolyester of this example. Nineteen parts of thylene glycol and 20 parts of a 75-25 dimethyl terephthalate-dimethyl isophthalate mixture were reacted together using 0.005 part of resorcinol titanate according to the method of Example 7. The copolymer prepared had a melt viscosity at 280° C. of 1300 poises. The copolymer was clear and had a light brown color.

*Example 11*

The product of Example 6 was used as the sole catalyst to prepare the 75-25 ethylene terephthalate ethylene isophthalate copolyester of this example. Nineteen parts of ethylene glycol and 20 parts of a 75-25 dimethyl terephthalate-dimethyl isophthalate mixture were reacted together using 0.005 part of isopropoxy titanium isophthalate according to the method of Example 7. The copolymer prepared had a melt viscosity at 280° C of 1600 poises. The copolyester was clear and had a light yellow color.

While the practice of the invention has been illlustrated with respect to 75-25 ethylene terephthalate-ethylene isophthalate, ethylene terephthalate, ethylene isophthalate and copolyesters containing any other ratio of ethylene terephthalate to ethylene isophthalate can similarly be made using the catalysts of the invention for the initial ester interchange or the polymerization reaction, by adjusting the proportions of the reactants.

The examples given illustrate the invention particularly with respect to the dimethyl esters and ethylene glycol. The invention will also work effectively with other esters of the phthalic acids such as the ethyl, propyl, butyl and phenyl esters. Other glycols, such as the propylene glycols and the butylene glycols, may also be used, although ethylene glycol is preferred because of its low cost and ready availability.

As shown in the examples, the terephthalate or isophthalate esters or mixtures thereof can be reacted with the glycol and the resultant glycol esters condensed to form a polymer, both stages of the reaction being carried out in the presence of the catalysts of the invention. However, the bis glycol ester may be prepared by any other suitable method, such as by reacting the sodium or potassium salt of the acid with ethylene chlorohydrin, or by reacting the acid with a large excess of the alcohol, or by glycolysis, using a catalyst for the ester interchange which is not a catalyst for the polymerization reaction. The bis esters, or a low molecular weight polymer thereof, can then be polymerized according to the usual, known techniques, using the catalysts of the present invention.

The preparation of the glycol ester and its subsequent polymerization is, in general, carried out in accordance with the usual, known techniques. Thus, the reaction is preferably carried out in the absence of oxygen, generally in an atmosphere of an inert gas such as nitrogen or the like, in order to lessen darkening and to make it possible to obtain a high molecular weight pale or colorless product. Bubbling the inert gas through the reaction mixture serves the added functions of agitation and of expediting the removal of volatile components formed by the reaction.

In the foregoing description, the polymerization of the bis glycol ester, with splitting out of glycol, has been referred to as a condensation reaction. It is also a form of ester interchange. Such reactions also include the condensation of a plurality of bis glycol esters of dicarboxylic acids in which the glycols or acids or both differ. Also included is the reaction of a bis glycol ester of a dicarboxylic acid with a glycol or other polyhydroxy organic compound which boils higher than the glycol of the bis glycol ester. Various glycols and acids may be used. The present invention resides in the use of novel catalysts in these known reactions.

The amount of the catalyst used may be varied over wide concentrations. As is usual with catalysts, the amount will ordinarily be relatively small. As a general rule, the amount will be within the range of from 0.003 to 0.10%, based on the dialkyl phthalate. The preferred range, to give a satisfactory reaction rate and a product of suitable viscosity and color, is 0.003 to 0.05%, based on the dialkyl phthalate.

No special precautions need be observed in handling these catalysts. Even if they come into contact with moist air or water and some of the alkoxy, aryloxy or aralkoxy substituents are hydrolyzed to hydroxyl radicals, they are still effective catalysts. Thus, in addition to the materials described and illustrated in the foregoing description, the invention includes products in which part or all of the alkoxy, aryloxy or aralkoxy radicals are replaced by hydroxyl groups.

It is preferred to use as catalyst a titanate derivative derived from a compound used to prepare the polymer, as this avoids the introduction into the polymer of residues having a different chemical structure in case any ester interchange takes place with the catalyst, but this is not essential, particularly in view of the fact that the catalyst is used in relatively small amount. These materials can be easily handled in small quantities. They are soluble in glycols in the amounts used as catalysts and are conveniently added to the ester interchange reaction mixture as a solution in the glycol, but they can also be added in the powder form.

While certain representative embodiments and details have been shown for the purpose of illustrating the invention, it will be apparent to those skilled in this art that various changes and modifications may be made therein within departing from the spirit or scope of the invention.

I claim:

1. In the process for preparing polyesters by the polymerization, with the removal of glycol, of bis glycol esters of dicarboxylic acids, the improvement which comprises mixing with said bis esters a catalytic amount of a preformed titanate compound in which titanium is attached by covalent linkages to oxygen atoms of radicals selected from the group consisting of aliphatic polyhydric radicals, aromatic polyhydric radicals, araliphatic polyhydric radicals, aliphatic polycarboxylic acid radicals, aromatic polycarboxylic acids radicals, araliphatic polycarboxylic acids, aliphatic hydroxy carboxylic acid radicals, aromatic hydroxy carboxylic acid radicals and araliphatic hydroxy carboxylic acid radicals in from 2 to 4 of the valence bonds of the titanium, the titanium valence bonds not occupied by radicals from the said selected group being occupied by radicals chosen from the group consisting of alkoxy, aryloxy, aralkoxy, and hydroxyl radicals and subjecting the bis esters to polymerization with the removal of glycol.

2. In a process for preparing a polyester by subjecting at least one bis ester of an acid selected from the group consisting of terephthalic and isophthalic acid to alcoholysis in the presence of an excess of a glycol and thereafter subjecting the bis glycol esters thus formed to self-condensation, with removal of the glycol, the improvement which comprises mixing with said bis esters a catalytic amount of a pre-formed titanate compound in which titanium is attached by covalent linkages to oxygen atoms of radicals selected from the group consisting of aliphatic polyhydric radicals, aromatic polyhydric radicals, aralyphatic polyhydric radicals, aliphatic polycarboxylic acid radicals, aromatic polycarboxylic acid radicals, araliphatic polycarboxylic acids, aliphatic hydroxy carboxylic acid radicals, aromatic hydroxy carboxylic acid radicals and araliphatic hydroxy carboxylic acid radicals, the titanium valence bonds not occupied by radicals in from 2 to 4 of the valence bonds of the titanium from the said selected group being occupied by radicals chosen from the group consisting of alkoxy, aryloxy, aralkoxy, and hydroxyl radicals and carrying out the alcoholysis and condensation reactions.

3. A process according to claim 2 in which the titanium compound is used in amount of 0.003 to 0.05% by weight of the weight of the esters of terephthalic acid and isophthalic acid.

4. In a process for preparing a polyester by the self-condensation, with the removal of ethyl glycol, of a bis ethylene-glycol ester of at least one acid selected from the group consisting of terephthalic acid and isophthalic acid, the improvement which comprises mixing a catalytic amount of a preformed glycol titanate with the bis ethylene-glycol ester and subjecting the mixture to condensation polymerization.

5. A process according to claim 4 in which the glycol titanate is used in amount of 0.003 to 0.05% by weight of the weight of the esters of terephthalic acid and isophthalic acid.

6. A process according to claim 1 in which the titanate used is a polymeric crosslinked ethylene-glycol titanate.

7. A process according to claim 1 in which the titanate used is a polymeric crosslinked tetramethylene-glycol titanate.

8. A process according to claim 1 in which the titanate used is a polymeric crosslinked decamethylene glycol titanate.

9. A process according to claim 2 in which the preformed titanate compound is polymeric crosslinked glycerol titanate.

10. A process according to claim 2 in which the preformed titanate compound is polymeric crosslinked resorcinol titanate.

11. As a new compound, polymeric crosslinked ethylene glycol titanate.

References Cited in the file of this patent

UNITED STATES PATENTS

| | | |
|---|---|---|
| 2,643,262 | Bostwick | June 23, 1953 |
| 2,720,502 | Caldwell | Oct. 11, 1955 |
| 2,721,855 | Kin | Oct. 25, 1955 |
| 2,822,348 | Haslam | Feb. 4, 1958 |